United States Patent
Erwin

[15] 3,685,702
[45] Aug. 22, 1972

[54] MEASURING DISPENSER
[72] Inventor: Ronald L. Erwin, Evansville, Ind.
[73] Assignee: Bernard Gerald Harter, Lynneville, Ind. ; a part interest
[22] Filed: Sept. 28, 1970
[21] Appl. No.: 76,060

[52] U.S. Cl. ..................222/305, 222/345, 222/366, 222/454
[51] Int. Cl...............................................G01f 11/10
[58] Field of Search..............141/108–110, 319–322, 141/328, 358, 373, 380; 221/266; 222/305, 363, 366, 454, 455, 345; 312/333

[56] References Cited

UNITED STATES PATENTS

| | | | |
|---|---|---|---|
| 2,083,135 | 6/1937 | Agerell et al. | 222/366 |
| 1,642,678 | 9/1927 | Horvath | 222/455 X |
| 2,653,072 | 9/1953 | Press | 312/333 X |
| 1,496,287 | 6/1924 | Ayars | 222/305 X |
| 637,514 | 11/1899 | Leek | 222/366 |
| 1,985,938 | 1/1935 | Luther | 222/366 |

*Primary Examiner*—Edward J. Earls
*Attorney*—Woodard, Weikart, Emhardt & Naughton

[57] ABSTRACT

A simple compact device for measuring liquids, powders, and granulated materials such as instant coffee. A small container, adapted to screw onto the opening of a larger container, has removably placed within it, a measuring element. In use, the small container is screwed onto the top of the larger container containing the materials to be measured, the combination is then inverted so that the materials enter the small container, and the combination is then returned to an upright position. A baffle in the small container directs the substance to be measured into a cavity in the measuring element. When the measuring element is removed from the small container, the substance is levelled to the proper amount by the edge of the small container.

8 Claims, 5 Drawing Figures

PATENTED AUG 22 1972 3,685,702

INVENTOR
RONALD L. ERWIN
BY
Woodard, Weikart, Emhardt & Naughton
ATTORNEYS

MEASURING DISPENSER

BACKGROUND OF THE INVENTION

1. Field of the Invention

This invention relates to a device for measuring and dispensing substances such as instant coffee.

2. Description of the Prior Art

Various devices are known in the prior art for measuring and dispensing substances. Ellis, U.S. Pat. No. 293,437, discloses the technique of inverting and uprighting to fill a measuring container, but his device will only work with a specially designed container. Other patents such as Russell U.S. Pat. No. 2,768,660 and 3,451,446 disclose dispensers that are adapted to fit a standard container, but they are designed to work only with liquids. Independent measuring spoons or other devices have been employed for removing the contents of these containers, but these have not always been convenient or readily accessible and care and skill have been necessary in handling the parts. Other U.S.Pats. of interest are German No. 3,077,213 and Kaufman No. 3,177,908.

SUMMARY OF THE INVENTION

The invention involves a device for use in measuring and dispensing which can be removably attached to a standard size container and which operates by inverting the combination of the device and the standard container and uprighting the combination. A baffle directs the contents to be measured and dispensed into a removable measuring element. Upon removal of the measuring element the contents of the measuring elements are automatically levelled to the measured amount.

DESCRIPTION OF THE PREFERRED EMBODIMENTS

Figure 1:
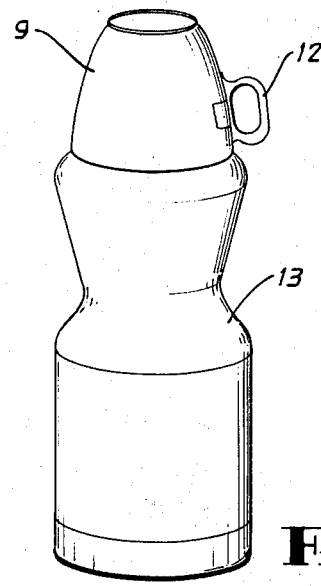
FIG. 1 is a perspective view of the device attached to a standard coffee container.
Figure 4:
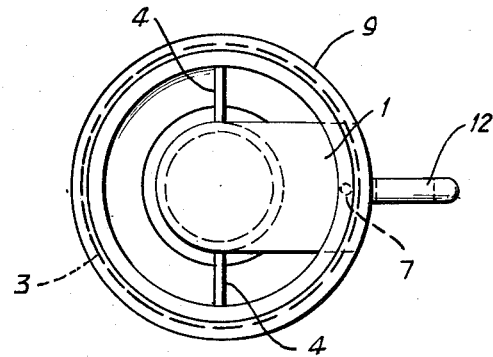
FIG. 4 is a bottom plan view of the structure of FIG. 2.
Figure 2:
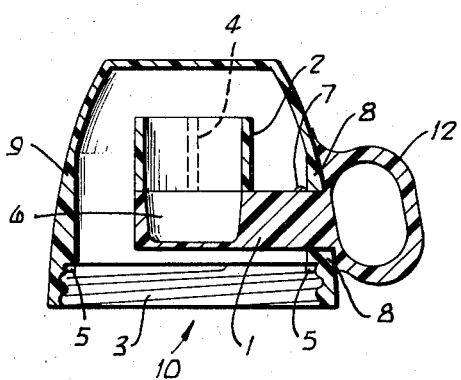
FIG. 2 is a cross section taken vertically along the axis of a portion of the structure of FIG. 1 and showing a measuring element forming a part of the device with the measuring element inserted into a cup also forming a part of the device.

Referring now more particularly to the drawings there is illustrated a cup 9 which serves as a container and which has threads 3 in its large opening 10 for attaching the cup 9 to a standard container 13. There is a seat 5 at the end of the threaded portion of the cup 9 to seal with the top of a jar. The cup 9 has a measuring element 1 inserted through a small opening in its side. Attached to the measuring element 1 is a handle 12 which serves as a handle for removing the element 1 and as a stop to prevent the measuring element from going any further into the cup. The side of the cup has a thickened area 8 around the element 1 to serve as a guide as element 1 is slid in and out of the cup. Toward the end of the element 1 there is a cavity 6 which has a volume equal to the volume desired to be measured. Positioned just above the cavity 6, when the element is fully inserted, is a cylindrical baffle 2 which is permanently and rigidly fixed to the cup by connecting elements 4. Element 1 has a resilient raised portion 7 which tends to latch the element 1 in place when full inserted.

In use, the cup 9 with element 1 fully inserted is screwed onto a standard container 13 so that the top of the standard container 13 presses against and seals with seat 5. The combination of the cup 9 and the standard container 13 are then inverted, causing the contents to fall into the cup. The combination is then uprighted causing most of the contents to fall back into the standard container. Some of the contents, however, will be directed by the baffle 2 towards the cavity 6 and material will fill both the cavity 6 and a portion of the space within the cylinder 2.

The measuring element 1 is then removed by pulling on the handle 12 with enough force to overcome the restraint caused by the raised portion 7. As the measuring element is removed the edge of the baffle close to the element 1 will level off the material in the cavity 6. Any excess material will fall into the standard container 13. The thickened area 8 will further serve to level the material a final time as the element 1 is removed from the cup 9.

Figure 5:
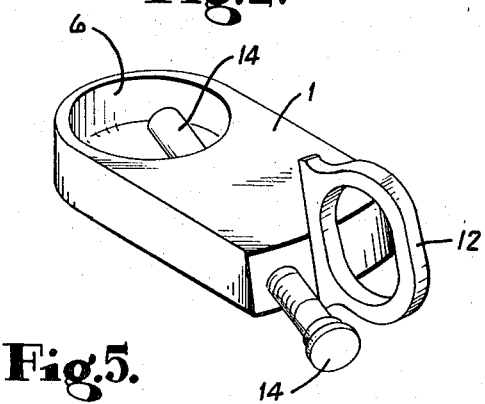
FIG. 5 is a perspective view of a measuring element with a variable size cavity and forming a part of an alternative embodiment of the invention.
Figure 3:
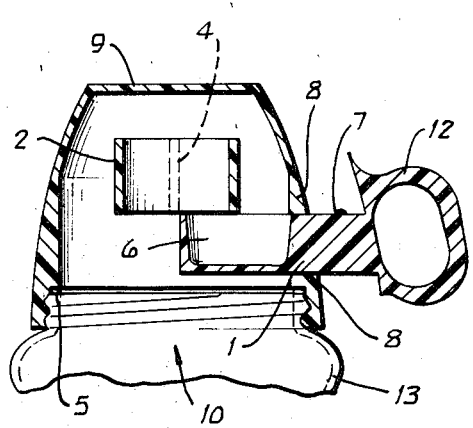
FIG. 3 is a view similar to FIG. 2 but showing the device in a different operating position the measuring element partially removed from the cup.

As illustrated in FIG. 5, the volume of cavity 6 may be varied by a graduated dowel 14 movable in and out of a cylindrical passage leading through the element 1 from an opening in the side of cavity 6 to an opening next to where the handle mounts to the element.

Since the threads 3 and the opening 10 are of standard size, this dispenser will be capable of being used on jars with standard sized tops.

While it would be possible to have a square opening in the measuring element and an adjacent square opening in the baffle, it would not be as effective in levelling granular materials. This is due to the fact that when an element with a square opening is removed, all portions of the levelling side of the opening in the baffle meet corresponding portions of the innermost side of the cavity at the same time. All resistance caused by granules which become lodged between the two sides occurs simultaneously and there is no place for the granules to go. This problem is avoided by the use of a circular cavity opening and a cylindrical baffle.

This device is versatile in that it can be used with various containers and with various substances whether they are liquid, powder, or granular. One embodiment may be adjusted to measure different qualities of material. A minimum of care and skill are necessary in using this device, thus such problems of independent measuring devices are eliminated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A measuring dispenser which comprises:
   a. a cup having two openings a first of which is for filling the cup and for attaching said cup to a standard container containing material to be measured and a second of which is for removing from the cup material which has been measured,
   b. a removable measuring element projecting into the cup through the second opening and having a cavity having an opening which opens in a direction opposite of the first opening,
   c. a handle attached to the measuring element for removing it from the cup,
   d. a baffle permanently and rigidly fixed within and to said cup and positioned so as to have one of its edges surrounding the opening on the cavity when the measuring element is fully inserted into the container to guide said material into said cavity, said baffle being adjacent to said element immediately next to the cavity opening to level said material within said cavity as said element is moved past said baffle and withdrawn from said cup.

2. The dispenser as defined in claim 1 in which the handle is contoured to fit the side of the cup when the measuring element is fully inserted.

3. The dispenser as defined in claim 1 which has means for varying the size of the cavity.

4. The dispenser as defined in claim 3 in which the means for varying the size of the cavity is a dowel which may be moved into and out of the cavity, said element having an passage through which said dowel is movable and is received.

5. The dispenser as defined in claim 1 in which the measuring element has a raised resilient portion engaging the inside of the cup and yieldably retaining the measuring element against removal from said cup.

6. The dispenser of claim 1 wherein:
   said baffle has a passage extending therethrough with one end of said passage in spaced relation with said cup allowing said material to enter through said one end and with an opposite end positioned above and opening into said cavity allowing said material to pass through said opposite end into said cavity.

7. The dispenser of claim 6 wherein:
   said passage and said opening of said cavity have identical adjacent cross sections, said baffle extends immediately above said element allowing said material to completely fill said cavity and extend up into said passage.

8. The dispenser of claim 7 wherein:
   said cup has a thickened side wall around the second opening thereof to serve as a guide and leveler as said element is moved therethrough.

* * * * *